(12) United States Patent
Imai

(10) Patent No.: US 10,120,723 B2
(45) Date of Patent: Nov. 6, 2018

(54) INFORMATION PROCESSING SYSTEM AND CONTROL METHOD FOR PROCESSING JOBS IN PLURALITY OF QUEUES

(71) Applicant: CANON KABUSHIKI KAISHA, Tokyo (JP)

(72) Inventor: Kazuo Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/168,625

(22) Filed: May 31, 2016

(65) Prior Publication Data

US 2016/0357609 A1 Dec. 8, 2016

(30) Foreign Application Priority Data

Jun. 5, 2015 (JP) .................................. 2015-115168

(51) Int. Cl.
*G06F 9/46* (2006.01)
*G06F 9/50* (2006.01)

(52) U.S. Cl.
CPC .................................. *G06F 9/5038* (2013.01)

(58) Field of Classification Search
None
See application file for complete search history.

(56) References Cited

U.S. PATENT DOCUMENTS 5,170,340 A * 12/1992 Prokop .................. G03G 15/50 399/1
5,923,826 A * 7/1999 Grzenda ............ H04N 1/00954 358/1.15
6,647,016 B1 * 11/2003 Isoda ..................... G06F 13/122 370/412
7,003,616 B2 * 2/2006 Shimura ............... G06F 3/1204 710/112
7,787,138 B2 * 8/2010 Lofthus .............. H04N 1/00954 358/1.13

(Continued)

FOREIGN PATENT DOCUMENTS

JP 201026815 A 2/2010

OTHER PUBLICATIONS

Karthick et al. "An Efficient Multi Queue Job Scheduling for Cloud Computing", 2014 IEEE, pp. 164-166.*

(Continued)

*Primary Examiner* — Van Nguyen
(74) *Attorney, Agent, or Firm* — Canon U.S.A., Inc. IP Division

(57) ABSTRACT

An information processing system for processing jobs managed by a plurality of queues includes a first input unit, a determination unit, and a second input unit. The first input unit inputs a first job regularly generated in the information processing system to a first queue. The determination unit determines a queue to which a second job should be input, out of a plurality of queues, wherein the second job is generated upon reception of a request corresponding to an input via a screen provided by the information processing system. The second input unit inputs the second job to a queue determined to be an input target of the second job by the determining. The determination unit determines the queue to which the second job should be input based on a processing state of data to be processed for the second job.

5 Claims, 21 Drawing Sheets

(56) References Cited

U.S. PATENT DOCUMENTS

| | | | |
|---|---|---|---|
| 7,995,225 B2* | 8/2011 | Lofthus | H04N 1/00954 |
| | | | 358/1.1 |
| 7,996,507 B2* | 8/2011 | Larkin | G06F 9/4862 |
| | | | 709/223 |
| 8,634,758 B2* | 1/2014 | Sato | G03G 15/6538 |
| | | | 358/1.15 |
| 9,417,912 B2* | 8/2016 | Suh | G06F 9/4887 |
| 9,674,086 B2* | 6/2017 | Ma | H04L 45/74 |
| 2007/0050490 A1* | 3/2007 | Larkin | G06F 9/4862 |
| | | | 709/223 |
| 2011/0225583 A1* | 9/2011 | Suh | G06F 9/4887 |
| | | | 718/1 |
| 2012/0069374 A1* | 3/2012 | Sasakura | G06K 15/1809 |
| | | | 358/1.13 |

OTHER PUBLICATIONS

Xue et al. "Customized Dynamic Array for Job Scheduling Queue of a Large-scale Server Cluster", 2011 IEEE, pp. 841-844.*

* cited by examiner

FIG.20

| QUEUE | WEIGHT |
|---|---|
| NORMAL QUEUE | 1 |
| PRE-CLOSING QUEUE | 3 |
| CLOSED QUEUE | 6 |

2013

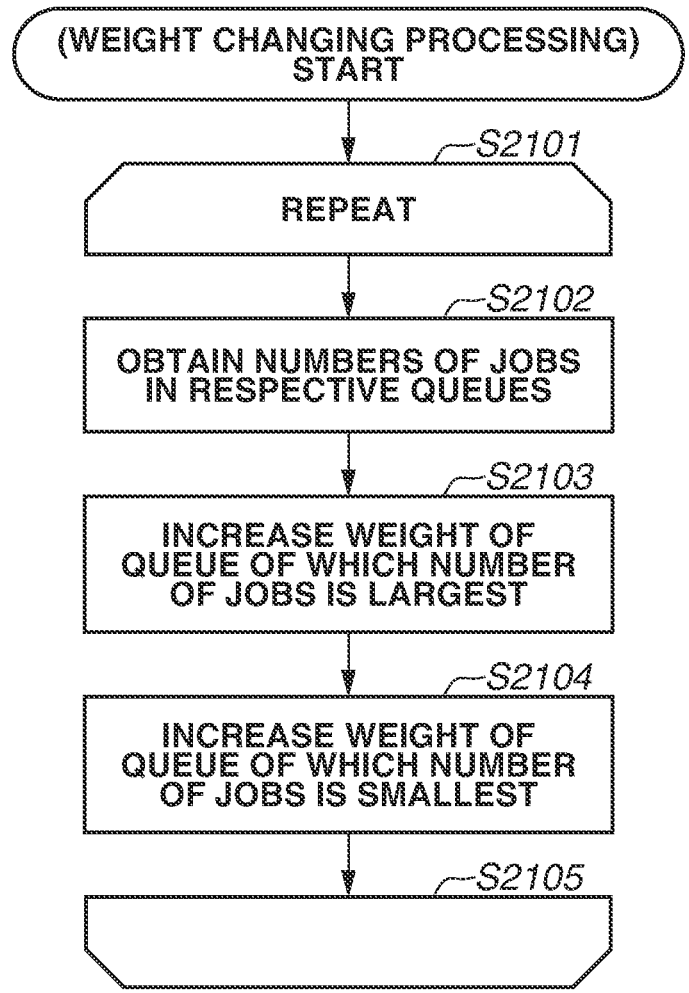

INFORMATION PROCESSING SYSTEM AND CONTROL METHOD FOR PROCESSING JOBS IN PLURALITY OF QUEUES

BACKGROUND OF THE INVENTION

Field of the Invention

The present invention relates to a technique for implementing control over an order of data processing using a plurality of queues.

Description of the Related Art

There are services for managing various network devices by a computing system constructed by using cloud services. Examples of the network devices include health appliances, image processing apparatuses, home electric appliances, and vehicle-mounted terminals. An information processing system using a cloud service collects a large amount of data, such as a log indicating an operation status from a plurality of network devices, and aggregates and analyzes the large amount of data afterwards. The result of aggregation or analysis can be presented as a report to a user. The report can be displayed on a web page. A report generated in the form of a file such as a Portable Document Format (PDF) file can be presented to the user.

It takes time to aggregate and analyze a large amount of logs. Logs are therefore aggregated, for example, by automatically generating a request for aggregate processing on a regular basis or by performing aggregation when a report generation request is accepted from the user.

In the case of sequentially performing aggregate processing for each request, suppose that a report generation request is accepted from the user during execution of regular aggregate processing. If in response to the report generation request, the aggregate processing is executed after the completion of the aggregate processing, it takes a substantial amount of time to present the report to the user. To present the report to the user in a short time, the priority of the aggregate processing needs to be managed appropriately.

Japanese Patent Application Laid-Open No. 2010-26815 discusses a technique for managing the priority of data processing to efficiently transmit data by using a plurality of types of queues. Specifically, two queues such as a high-speed queue and a low-speed queue are used to distribute and process data between the queues according to the priority of the data to be processed.

The foregoing aggregate and analysis processing of the information processing system can also be performed in consideration of the priorities of respective requests by using a plurality of queues. Specifically, if a report generation request is accepted from the user, the request is input to a priority queue for processing requests of relatively high priority. In performing an aggregation process, requests input to the priority queue can be handled first.

As described above, a plurality of queues may be used to manage requests of different priorities. In such a case, for example, if the user requests the generation of a report, the user's waiting time until the presentation of the report can be reduced.

However, if all report generation requests from the user are input to the priority queue as requests of the same high priority, the processing of a request of even higher priority in the priority queue can be delayed. Report generation requests from the user may include a request of a low processing load.

Therefore, when processing efficiency of each request in the system and the waiting time of the system user are taken into consideration, the input method and processing order of the requests to be input to a priority queue need to be controlled depending on the contents of the requests.

SUMMARY OF THE INVENTION

According to an aspect of the present invention, an information processing system for processing jobs managed by a plurality of queues includes a first input unit configured to input a first job regularly generated in the information processing system to a first queue, a determination unit configured to determine a queue to which a second job should be input, out of a plurality of queues, wherein the second job is generated upon reception of a request corresponding to an input via a screen provided by the information processing system, and a second input unit configured to input the second job to a queue determined to be an input target of the second job by the determining unit, wherein the determination unit is configured to determine the queue to which the second job should be input based on a processing state of data to be processed for the second job.

In a case where the processing efficiency of requests in a system and a user's waiting time are taken into consideration, an input method and processing order of requests to be input to priority queues need to be controlled depending on the contents of the requests. A system according to the present invention is an information processing system including a determination unit configured to determine a queue to which a job should be input, out of a plurality of queues based on a processing state of data to be processed by the job, the job being generated upon reception of a request corresponding to an input via a screen provided by the system. Further features of the present invention will become apparent from the following description of exemplary embodiments with reference to the attached drawings.

BRIEF DESCRIPTION OF THE DRAWINGS

FIG. 20 is a diagram illustrating an example of a table for managing weights set for respective queues according to the fifth exemplary embodiment.

FIG. 21 is a flowchart for describing processing for changing the weights of the respective queues according to a sixth exemplary embodiment.

DESCRIPTION OF THE EMBODIMENTS

Exemplary embodiments for carrying out the present invention will be described below with reference to the drawings.

Figure 1:
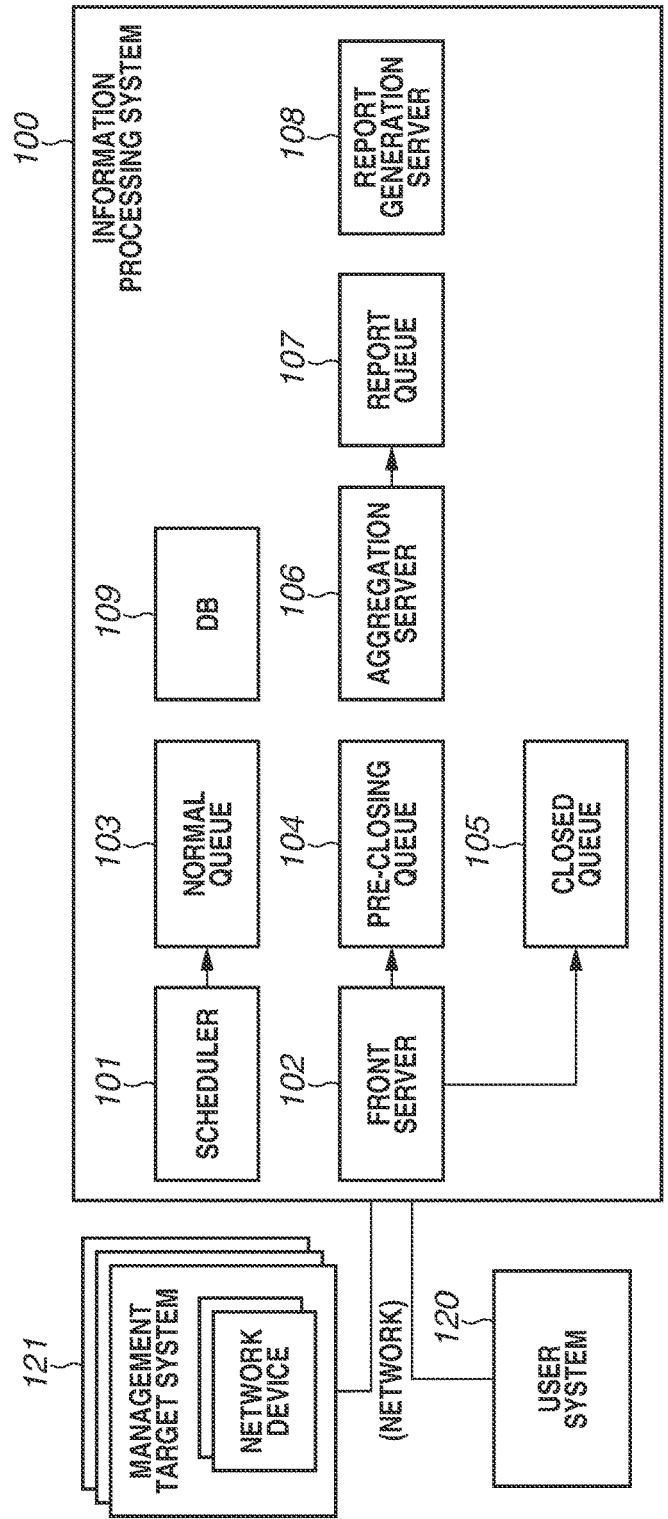
FIG. 1 is a diagram illustrating a configuration example of a network system according to the present invention.

A first exemplary embodiment will be described below. FIG. 1 is a diagram illustrating an example of a configuration of a network system according to the first exemplary embodiment of the present invention. An information processing system 100 includes a scheduler 101, a front server 102, a plurality of queues and databases, an aggregation server 106, and a report generation server 108.

The information processing system 100 is a system constructed by using hardware resources provided by a plurality of information processing apparatuses, like a data center. In the information processing system 100, a plurality of virtual machines operates as servers such as the foregoing front server 102. The information processing apparatuses include, for example, a central processing unit (CPU), a random access memory (RAM), a read-only memory (ROM), an external storage unit, and a network interface (I/F) control unit as their hardware configuration. The CPU executes an operation system (OS) and a predetermined program for configuring a virtual machine. A program for implementing processing according to the first exemplary embodiment of the present invention to be described below is executed on the virtual machine(s). The information processing system 100 may be constructed without the use of virtualization techniques. All server groups included in the information processing system 100 do not need to be located in the same region. The server groups may be located in different countries or regions as long as the server groups can communicate with each other via a network.

The information processing system 100 receives and processes a request input to a computer in a user system 120 from an administrator. The user system 120 may include an application server for providing a service in addition to a personal computer (PC) for the administrator to operate. The user system 120 connects to the information processing system 100 via a network such as the Internet. A management target system 121 represents a network environment including network devices to be managed by the information processing system 100. The information processing system 100 collects data with respect to the network devices via the network, and stores the data into a database (DB) 109. The data includes a log indicating operation statuses of the network devices in the management target system 121. There may be a plurality of user systems 120 and a plurality of management target systems 121 on the network.

The scheduler 101 of the information processing system 100 inputs jobs to a normal queue 103 according to a predetermined schedule. The front server 102 accepts and processes a request from the scheduler 120 or the management target system 121. If a request for report generation is accepted, the front server 102 inputs a job corresponding to the request to a pre-closing queue 104 or a closed queue 105. As compared to the normal queue 103, the pre-closing queue 104 and the closed queue 105 manage jobs of higher priority which require immediacy to deal with a request generated by a direct instruction input from the administrator.

The aggregation server 106 obtains jobs from the normal queue 103, the pre-closing queue 104, and the closed queue 105, and executes processing according to the jobs. For example, if a job corresponding to a request for aggregation or analysis is obtained, the aggregation server 106 obtains target data from the DB 109 and executes aggregate or analysis processing. If a job corresponding to a report generation request is obtained, the aggregation server 106 obtains target data from the DB 109, and executes aggregate processing. After the completion of the aggregate processing, the aggregation server 106 inputs a job corresponding to a request for report generation to a report queue 107. The report generation server 108 obtains the job from the report queue 107, and executes report generation processing by using aggregated data stored in the DB 109. The information processing system 100 then provides information by using the generated report according to the request.

The DB 109 stores programs for implementing the information processing system 100 and various types of data for providing services to all users who possess network devices managed by the information processing system 100. There may exist a plurality of front servers 102, a plurality of aggregation servers 106, and a plurality of report generation servers 108.

Figure 2:
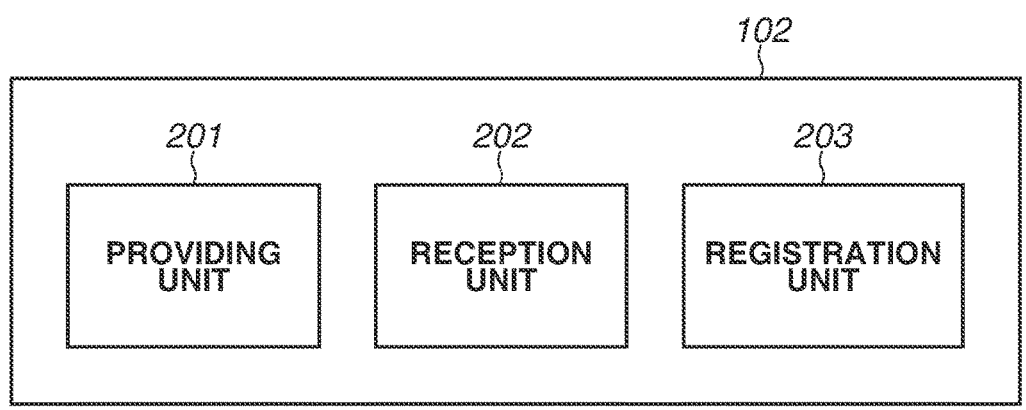
FIG. 2 is a diagram illustrating a configuration example of a front server according to the present invention.

FIG. 2 is a diagram illustrating a configuration example of the front server 102 according to the first exemplary embodiment of the present invention. The front server 102 includes a providing unit 201, a reception unit 202, and a registration unit 203.

The providing unit 201 provides a graphical user interface (GUI) for accepting a request for report generation and so on from the administrator. The providing unit 201 provides the GUI to a PC in the user system 102 or the management target system 121. Information provision from the providing unit 201 can be displayed on a web browser running on the PC. Other than the request for report generation, the providing unit 201 can also provide various types of information managed by the information processing system 100 to the PC via the network.

The reception unit 202 accepts various requests according to instructions input via the GUI based on the information provided by the providing unit 201. A request for report generation includes various attributes for report generation. For example, a target device, a target user, a target user group, and a target period are included as the attributes. The registration unit 203 inputs the accepted requests to the pre-closing queue 104 or the closed queue 105 as jobs. Jobs to be managed by the respective queues will be described in detail below with reference to FIG. 4.

Figure 3:
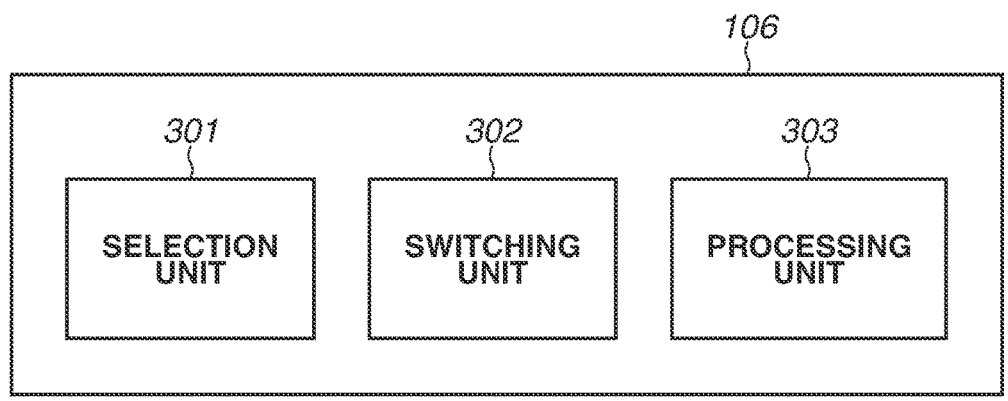
FIG. 3 is a diagram illustrating a configuration example of an aggregation server according to the present invention.

FIG. 3 is a diagram illustrating a configuration example of the aggregation server 106 according to the first exemplary embodiment of the present invention. The aggregation server 106 includes a selection unit 301, a switching unit 302, and a processing unit 303.

The selection unit 301 determines the normal queue 103, the pre-closing queue 104, or the closed queue 105 from which a job is to be obtained. The switching unit 302 switches processing to be performed after the acquisition of the job, depending on the normal queue 103, the pre-closing queue 104, or the closed queue 105 from which the job has been obtained. The processing unit 303 executes aggregate or analysis processing requested by the job.

Figure 4:
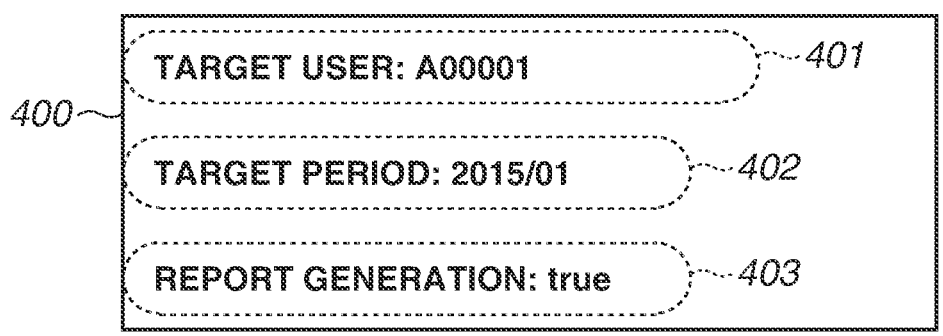
FIG. 4 is a diagram illustrating an example of a job managed by a pre-closing queue or a closed queue.

FIG. 4 is a diagram illustrating an example of attribute information included in a job 400 managed by the pre-closing queue 104 or the closed queue 105.

Figure 6:
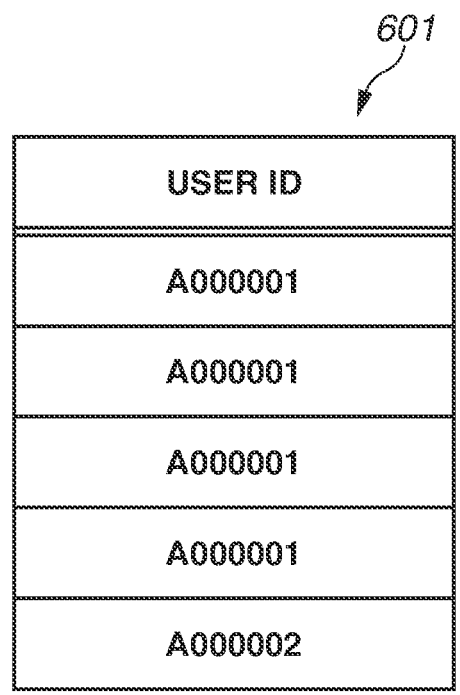
FIG. 6 is a diagram illustrating an example of a user identifier (ID) table for managing users of an information processing system.

A target user 401 is an item to specify a user identifier (ID) for identifying data to be processed. FIG. 6 illustrates a user ID table 601 which lists user IDs assigned to all users who possess network devices to be managed by the information processing system 100. For example, if the front server 102 generates a job corresponding to a request for report generation, the user ID included in the request is set to the job. A target period 402 specifies time information such as year and month, for identifying the data to be processed. Such information is also included in the request for report generation.

A report generation 403 is an item indicating whether to execute report generation. If a report needs to be generated, "true" is set to the report generation 403. If the request is intended for simple aggregation or analysis without report generation, "false" is set to the report generation 403. Further, as the attribute information about the job 400, other information for identifying the processing target may be included. For example, designation of a target network device or designation of a target user group can be included.

FIG. 6 is a diagram illustrating an example of attribute information included in a job 500 to be managed by the normal queue 103.

Like the job 400, the job 500 also includes attribute information including a target user 501, a target period 502, and a report generation 503.

The job 500 is automatically generated by the scheduler 101.

The information processing system 100 can specify a period such as a month and generate a report by using the report generation server 108. Further, the information processing system 100 performs closing processing (processing for fixing aggregate results), for example, on a monthly basis so that aggregate results up to specific time can no longer be changed. For the purpose of such closing processing, the scheduler 101 automatically generates a task for aggregating data such as a log stored in the DB 109 about every user on a monthly basis.

The job 500 shows that it performs aggregate processing on the log of all months in which the closing processing has not been completed, with respect to the log of the user indicated by the user ID "A00002."

Figure 7:
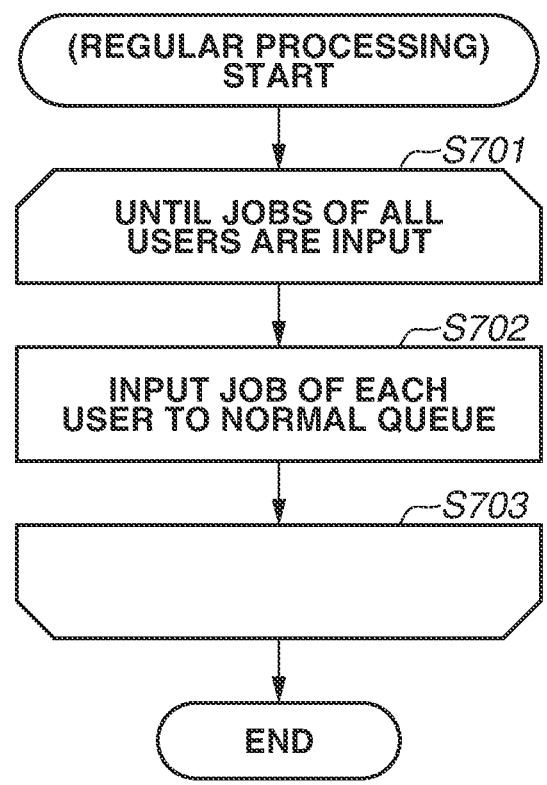
FIG. 7 is a flowchart for describing job input processing by a scheduler.

FIG. 7 is a flowchart for describing job input processing to be regularly executed by the scheduler 101. The scheduler 101 automatically generates jobs for the closing processing, at predetermined time intervals, and inputs the jobs to the normal queue 103. In the present exemplary embodiment, since charging and operation status reports related to the use of the network devices is regularly provided to the users, the scheduler 101 is assumed to automatically execute the processing illustrated in FIG. 7 monthly, for example, at the end of every month.

The scheduler 101 executes the processing of steps S701 to S703 with respect to all the users who possess the network devices managed by the information processing system 100. In step S702, the scheduler 101 inputs a job 500 corresponding to each user to the normal queue 103.

Figure 8:
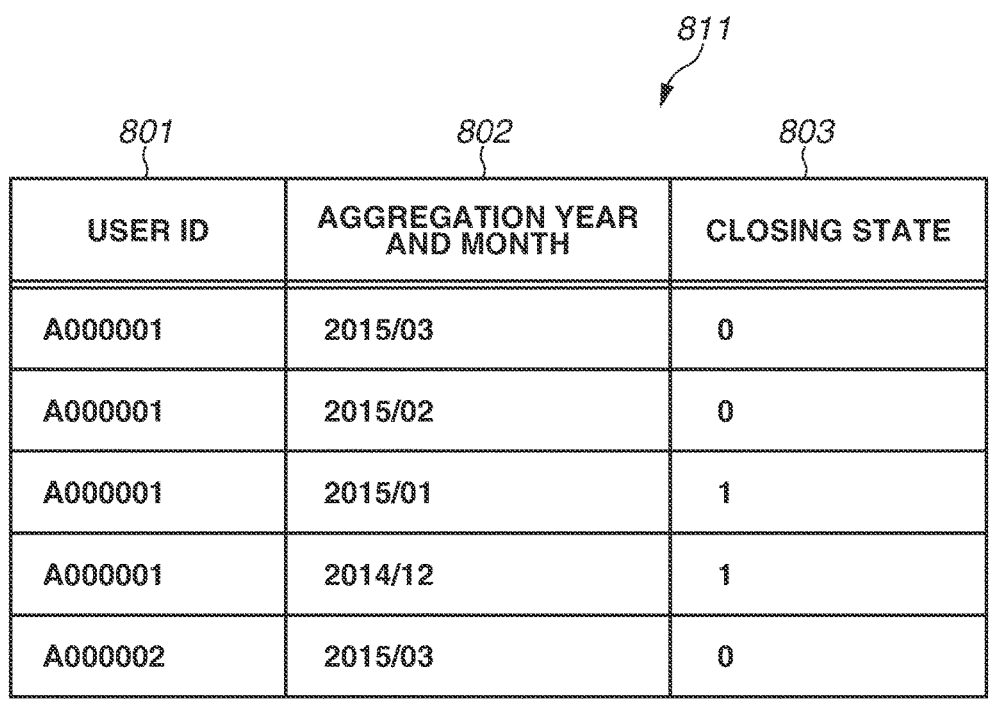
FIG. 8 is a diagram illustrating an example of a monthly aggregate state table.

FIG. 8 is a diagram illustrating an example of a monthly aggregate state table stored in the DB 109. The table manages the closing state of each user in each aggregation period.

When the aggregation server 106 completes aggregate processing, the corresponding value of a closing state 803 is updated. If the aggregate processing is completed and the target period is closed, the value of the closing state 803 is updated from "0" to "1." For example, as illustrated by a record 811, the aggregate processing of data identified by a user ID 801 "A00001" and an aggregation year and month 802 "2015/03" has not been completed, and the value of the closing state 803 is "0."

Figure 9:
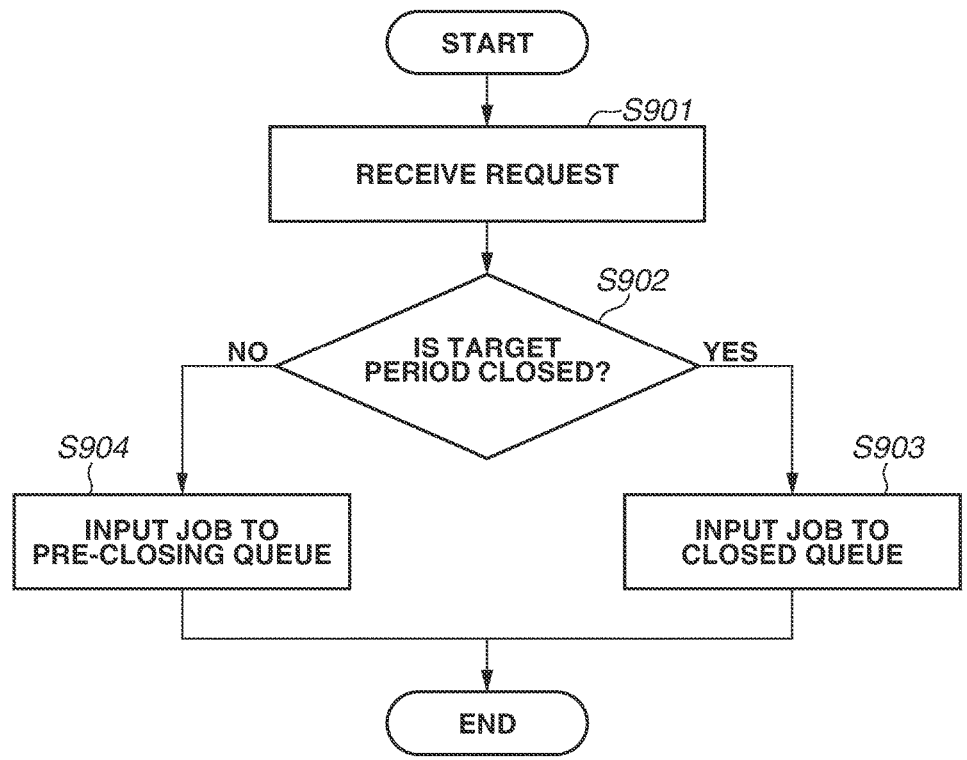
FIG. 9 is a flowchart for describing processing when a front server according to a first exemplary embodiment receives a processing request.

FIG. 9 is a flowchart for describing processing performed when the front server 102 according to the first exemplary embodiment receives a processing request to be executed. In the processing, a job is put into a predetermined queue in response to the request received by the front server 102 according to an input by the user.

Figure 13:
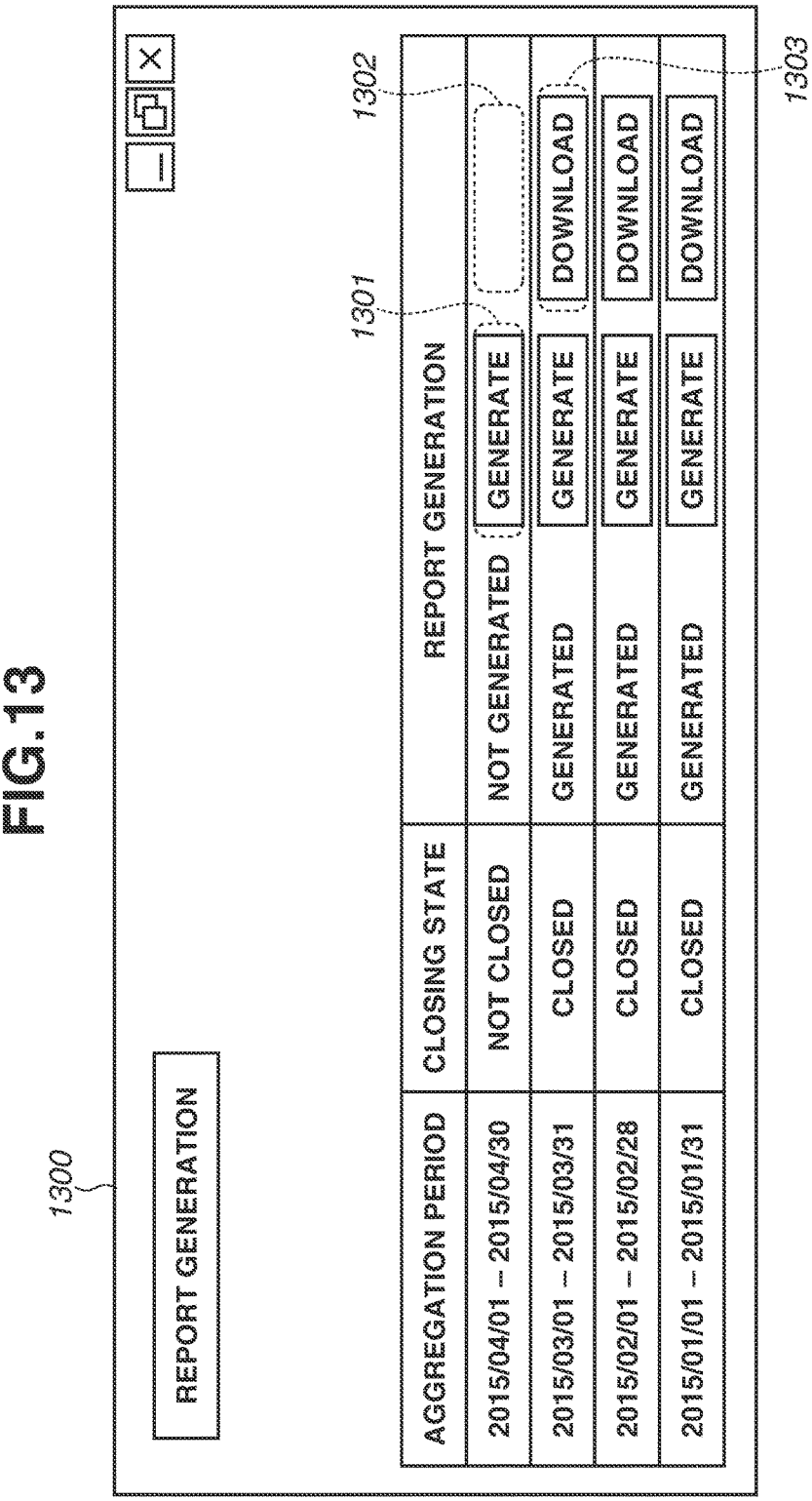
FIG. 13 is a diagram illustrating an example of a report generation page according to the present invention.

In step S901, the reception unit 202 receives a request that is input via the GUI provided by the providing unit 201. It is assumed that a request for report request is received via a GUI screen illustrated in FIG. 13. The GUI screen is an example of a report generation page displayed by the web browser based on hypertext markup language (HTML) data provided by the providing unit 201. The administrator can press a generation button 1301 to select the target period and request report generation. The administrator can further press a download button 1303 to request download of a generated report (file) from the front server 102. Download buttons 1303 are provided if the aggregate processing is completed and the report generation is completed. If the administrator presses a report generation button 1301 and it takes a long time for a download button 1303 to appear in a position 1302, the usability is impaired. The present exemplary embodiment is directed to suppressing the impairment in usability.

In step S902, the registration unit 203 refers to the aggregate state table illustrated in FIG. 8 and determines whether the target period specified by the received request is closed. More specifically, if the request is made for data in a closed period in which the aggregate processing by the aggregation server 106 is completed (YES in step S902), the processing proceeds to step S903. If the request is determined not to be made for such data (NO in step S902), the processing proceeds to step S904.

In step S903, the registration unit 203 inputs a job including the contents specified by the received request as the attribute information to the closed queue 105. In step S904, the registration unit 203 inputs a job including the contents specified by the received request as the attribute information to the pre-closing queue 104. Then, the present processing ends.

Figure 10:
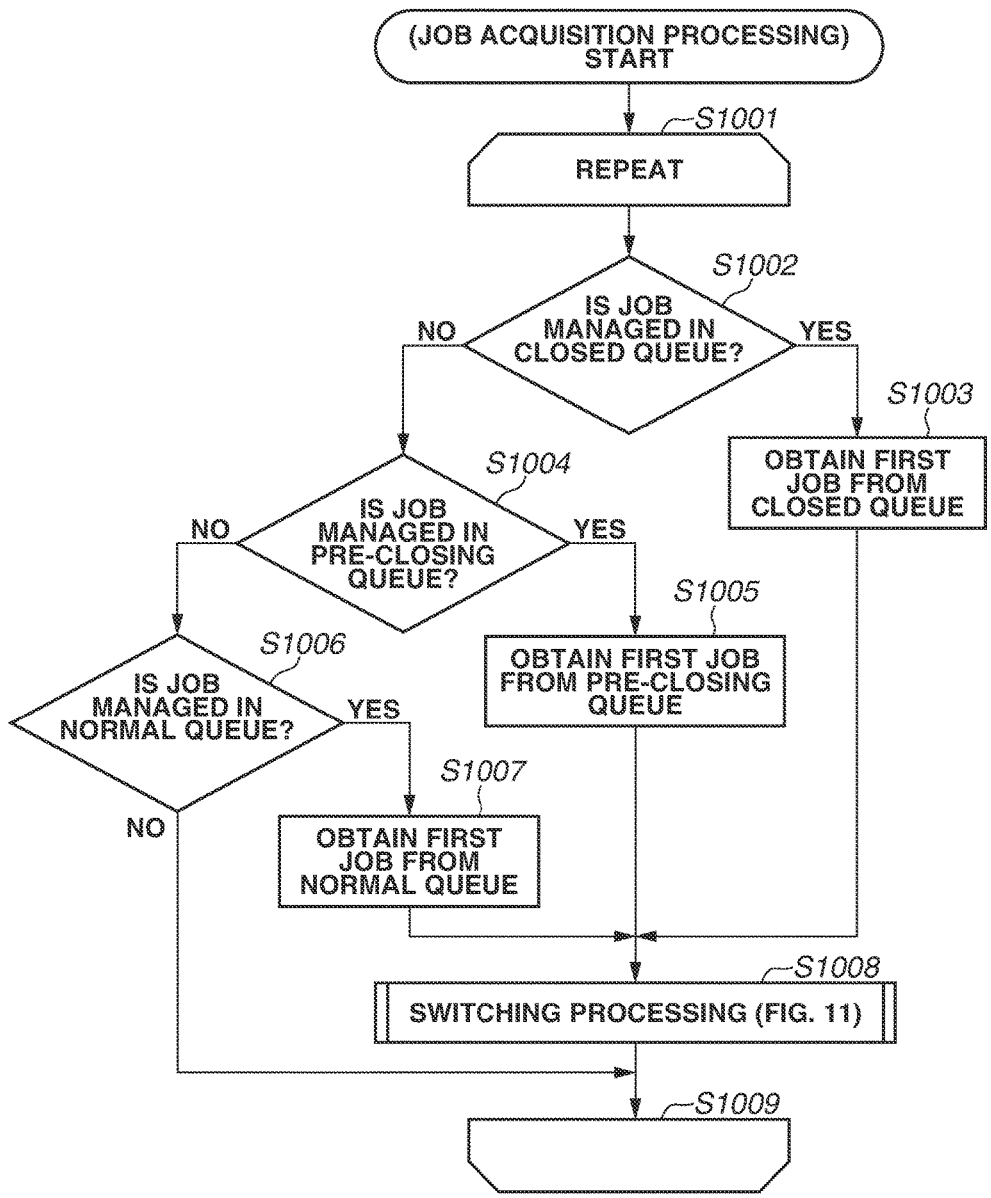
FIG. 10 is a flowchart for describing job acquisition processing by an aggregation server according to the first exemplary embodiment.

FIG. 10 is a flowchart for describing job acquisition processing by the aggregation server 106 according to the first exemplary embodiment. The aggregation server 106 repeats the processing of steps S1001 to S1009.

In step S1002, the selection unit 301 determines whether a job is managed in the closed queue 105. If any job is managed in the closed queue 105 (YES in step S1002), the processing proceeds to step S1003. If no job is managed in the closed queue 105 (NO in step S1002), the processing proceeds to step S1004. In step S1003, the selection unit 301 obtains a front job from the closed queue 105.

In step S1004, the selection unit 301 determines whether a job is managed in the pre-closing queue 104. If any job is managed in the pre-closing queue 104 (YES in step S1004), the processing proceeds to step S1005. If no job is managed in the pre-closing queue 104 (NO in step S1004), the processing proceeds to step S1006. In step S1005, the selection unit 301 obtains a front job from the pre-closing queue 104.

In step S1006, the selection unit 301 determines whether a job is managed in the normal queue 103. If any job is managed in the normal queue 103 (YES in step S1006), the processing proceeds to step S1007. If no job is managed in the normal queue 103 (NO in step S1006), the processing proceeds to step S1009. In step S1007, the selection unit 301 obtains a front job from the normal queue 103.

Figure 11:
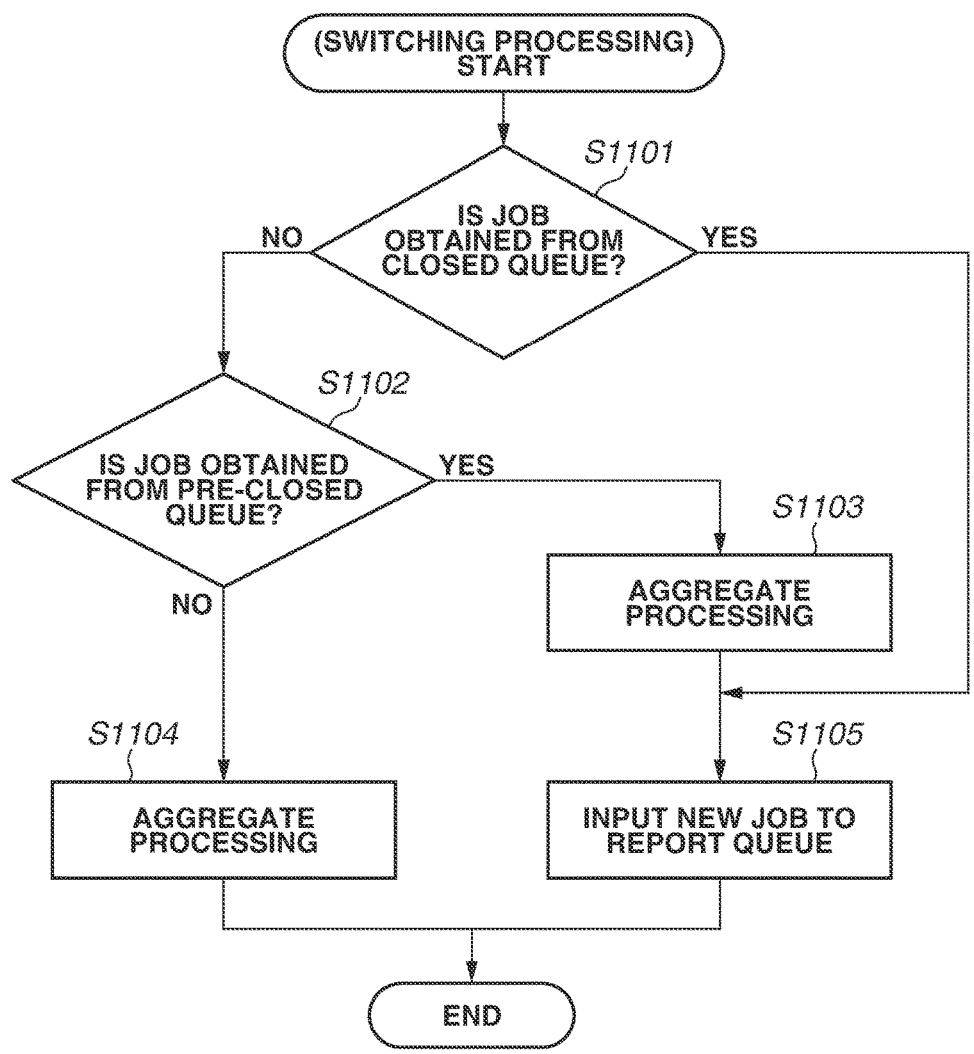
FIG. 11 is a flowchart for describing switching processing by the aggregation server according to the first exemplary embodiment.

In step S1008, the switching unit 302 executes switching processing (FIG. 11).

FIG. 11 is a flowchart for describing the switching processing by the aggregation server 106 according to the first exemplary embodiment.

In step S1101, the switching unit 302 determines whether the processing target job acquired in FIG. 10 has been obtained from the closed queue 105. If the job has been obtained from the closed queue 105 (YES in step S1101), the processing proceeds to step S1105. If not (NO in step S1101), the processing proceeds to step S1102. If the job is obtained from the closed queue 105, the aggregate processing of the job is skipped to advance the processing to step S1105. The reason is that the aggregate processing of the target period has already been completed by the processing of a job managed by the normal queue 103 which is automatically generated by the scheduler 101, or a job managed by the pre-closing queue 104.

In step S1102, the switching unit 302 determines whether the processing target job has been obtained from the pre-closing queue 104. If the job has been obtained from the pre-closing queue 104 (YES in step S1102), the processing proceeds to step S1103. If not (NO in step S1102), the processing proceeds to step S1104.

In steps S1103 and S1104, the processing unit 303 obtains the data of the processing target log and executes aggregate processing according to the attribute information about the job to be processed. The aggregated data is stored back into the DB 109. When the aggregate processing is completed, the value of the closing state 803 in the aggregate state table illustrated in FIG. 8 is updated. Examples of the aggregate processing to be executed here include the aggregation of the number of processings executed by a network device has within the target period, the frequency of occurrence of failures such as an error, and the duration of normal operation.

In step S1105, the switching unit 302 inputs a new job to the report queue 107. The job to be input here is one for causing the report generation server 108 to execute report generation, which inherits the attribute information of the process target job such as the target user and the target period.

The jobs managed in the pre-closing queue 104 and the closed queue 105 both deal with requests specified by the user via the GUI provided by the front server 102. Such requests are directly specified by the user and thus have a high priority, which needs some immediacy up to time that a report is provided. On the other hand, the jobs managed by the normal queue 103 do not need the provision of a report, and thus it can be said that it has a relatively low priority as compared to the jobs managed in the pre-closing queue 104 and the closed queue 105. In other words, it can be said that the present exemplary embodiment uses two priority queues, which are the pre-closing queue 104 and the closed queue 105.

As can be seen from the processing illustrated in FIG. 11, the aggregation server 106 completes the processing of the job managed in the closed queue 105 obviously earlier than the job managed in the pre-closing queue 104 since the aggregate processing illustrated in step S1103 is skipped. As illustrated in FIG. 10, the present exemplary embodiment is configured such that the job managed in the closed queue 105 is processed ahead of the job managed in the closed queue 104.

For example, suppose that a plurality of users makes requests for report generation almost at the same time, and the requests include a request specifying a period within which the aggregate processing is completed. The configuration of the present exemplary embodiment can reduce an average waiting time till the plurality of users receives a report as compared to when the jobs corresponding to such requests are processed in order. Further, the waiting time of the first user till he receives a report can also be improved significantly.

Figure 12:
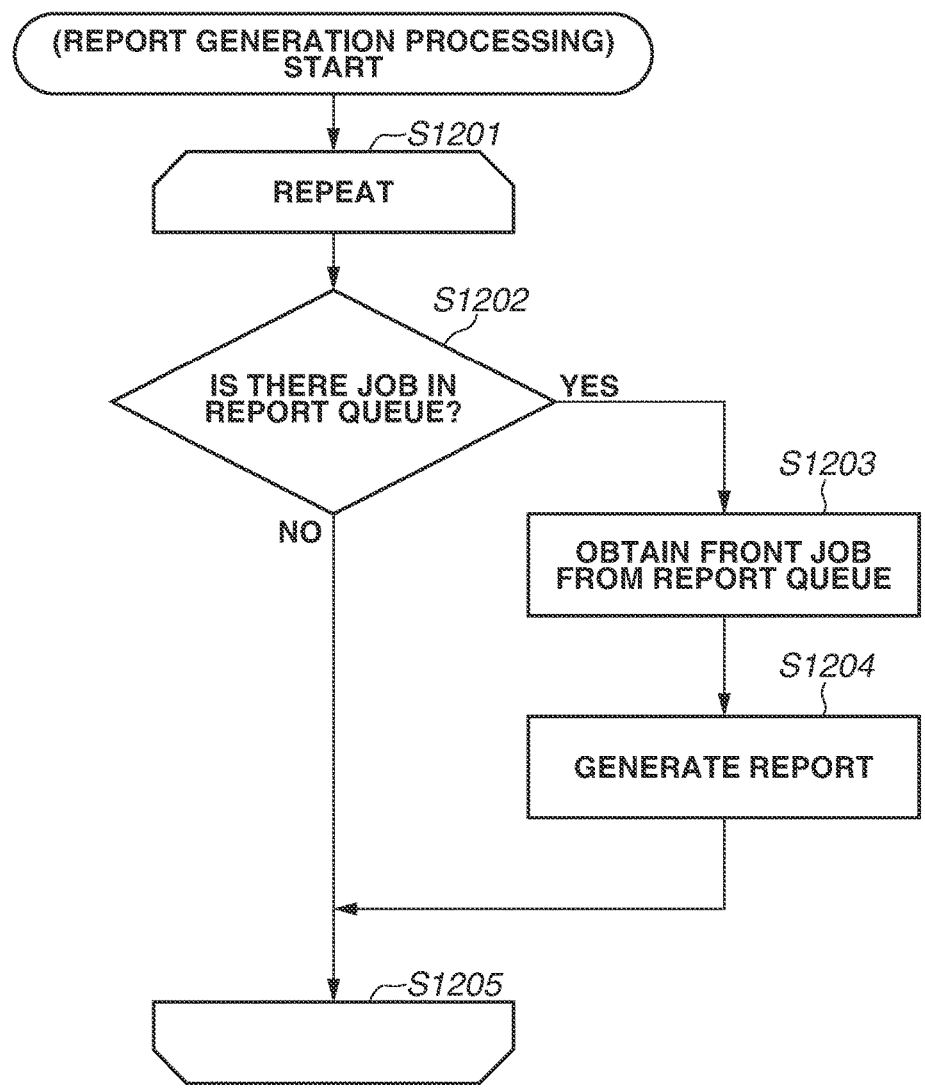
FIG. 12 is a flowchart for describing processing by a report generation server according to the present invention.

FIG. 12 is a flowchart for describing the report generation processing by the report generation server 108 according to the first exemplary embodiment of the present invention.

The report generation server 108 repeats the processing of steps S1201 to S1205. In step S1202, the report generation server 108 determines whether there is a job in the report queue 107. If there is any job (YES in step S1202), the processing proceeds to step S1203. If there is no job (NO in step S1202), the processing proceeds to step S1205.

In step S1203, the report generation server 108 obtains a front job from the report queue 107. In step S1204, the report generation server 108 obtains the aggregated data to be processed from the DB 109 and generates a report according to the attribute information about the obtained job.

Figure 14:
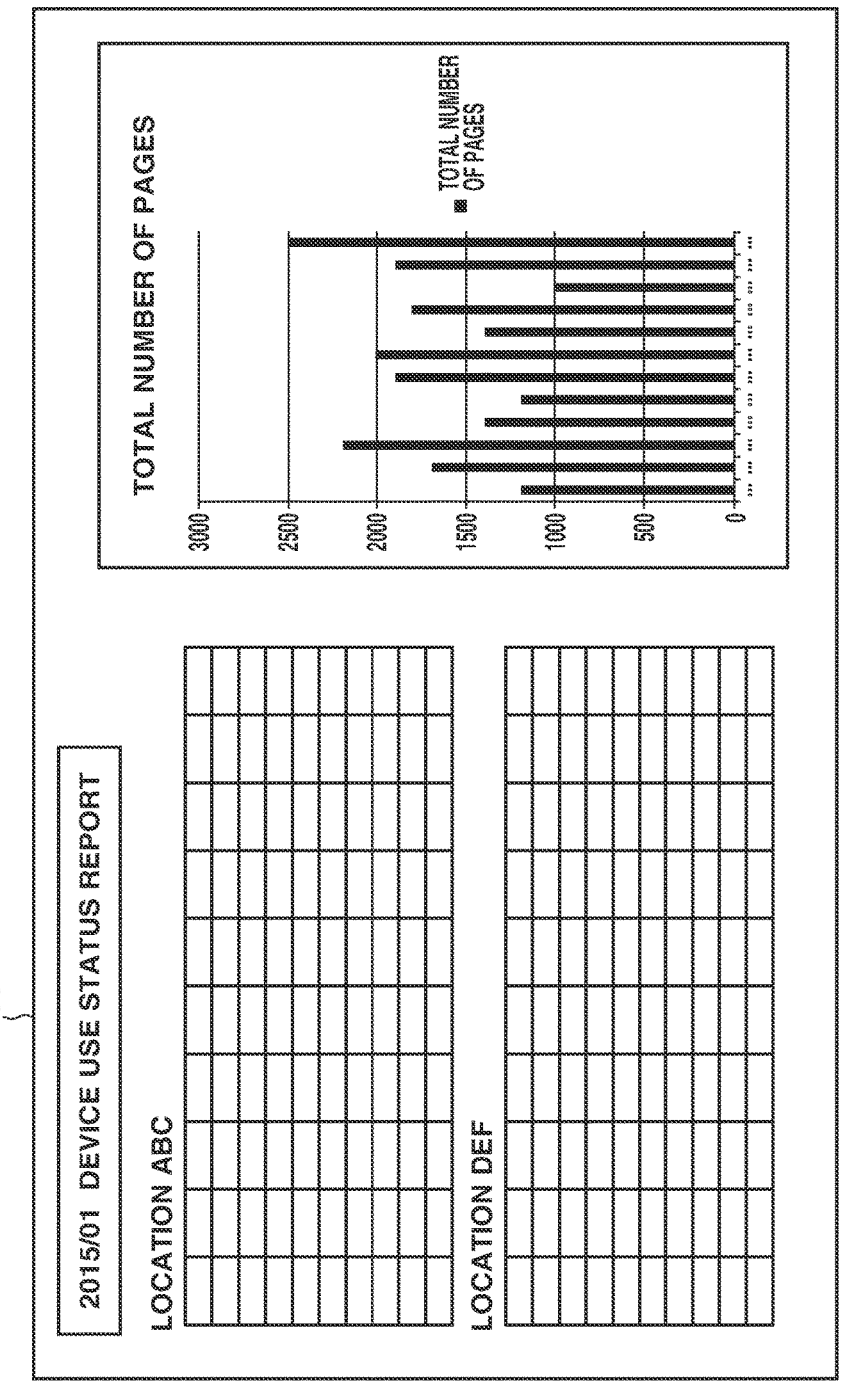
FIG. 14 is a diagram illustrating an example of a report presented to a user.

FIG. 14 is a diagram illustrating an example of a report provided to the user according to the exemplary embodiment of the present invention. A report 1400 includes statistical data on the operation status (such as the number of times of processings or failure history) of a network device within a period. Take an image forming apparatus as an example of the network device. The report 1400 may include various types of information such as the number of printed sheets in a specified month or a target year. A report file containing such contents can be downloaded according to a request via a download button 1303 illustrated in FIG. 13.

The first exemplary embodiment has been described above.

A second exemplary embodiment will be described below. Similar effects to those of the first exemplary embodiment can be obtained by modifying part of the processing of the first exemplary embodiment illustrated in FIG. 9. The second exemplary embodiment deals with such processing.

Figure 15:
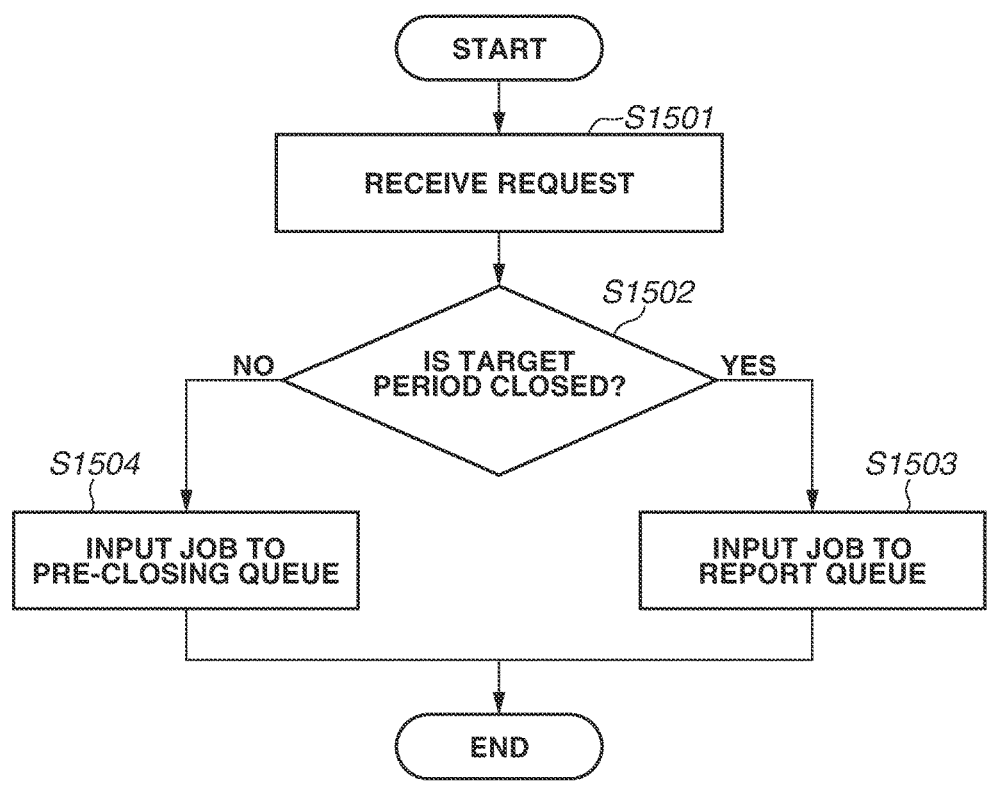
FIG. 15 is a flowchart for describing processing when a front server according to a second exemplary embodiment receives a processing request.

FIG. 15 is a modification of FIG. 9 according to the first exemplary embodiment. The system configuration and processing according to the second exemplary embodiment are similar to those of the first exemplary embodiment, and thus a description thereof will be omitted except FIG. 9.

In step S1501, the reception unit 202 receives a request input via the GUI provided by the providing unit 201.

In step S1502, the registration unit 203 refers to the aggregate state table illustrated in FIG. 8 and determines whether the target period specified by the received request is closed. If the target period is closed (YES in step S1502), the processing proceeds to step S1503. If the target period is determined to not be closed (NO in step S1502), the processing proceeds to step S1503. If not (NO in step S1502), the processing proceeds to step S1504.

In step S1503, the registration unit 203 directly inputs a job including the contents specified by the received request as the attribute information to the report queue 107. This job is a job for causing the report generation server 108 to generate a report. In step S1504, the registration unit 203 inputs a job including the contents specified by the received request as the attribute information to the pre-closing queue 104. The present processing ends.

According to the present processing, the report generation server 180 is configured to process a job corresponding to a report generation request by using data of a closed period on a priority basis, skipping the aggregate processing. Like the first exemplary embodiment, such a configuration can achieve the effect of reducing the waiting time of a plurality of users in a case where the users issue requests for report generation almost at the same time.

The method according to the second exemplary embodiment can be implemented without providing the closed queue 105 for the information processing system 100. If the closed queue 105 is not provided, the processing in steps S1002 and S1003 in FIG. 10 and step S1101 in FIG. 11 according to the first exemplary embodiment is also omitted.

According to a third exemplary embodiment, the information processing system 100 further includes a configuration for monitoring the numbers of jobs managed in each queue. In the present exemplary embodiment, the aggregation server 106 is scaled out or up if the monitoring result exceeds an upper limit (threshold) of the number of jobs set for each queue. The other processing of the present exemplary embodiment has almost the same configuration as that of the foregoing exemplary embodiments. Only differences from the foregoing embodiments will thus be described.

The aggregation server 106 is implemented by one or more virtual machines. The cloud service for providing the virtual machines is capable of increasing (scaling out) the number of virtual machines to function as the aggregation server 106 or enhancing (scaling up) the processing power of the virtual machines functioning as the aggregation server 106. This can suppress delay of processing in the aggregation server 106 if there are a lot of jobs to be processed. If the numbers of jobs managed in the respective queues are small, the aggregation server 106 can be scaled in or down.

Figure 16:
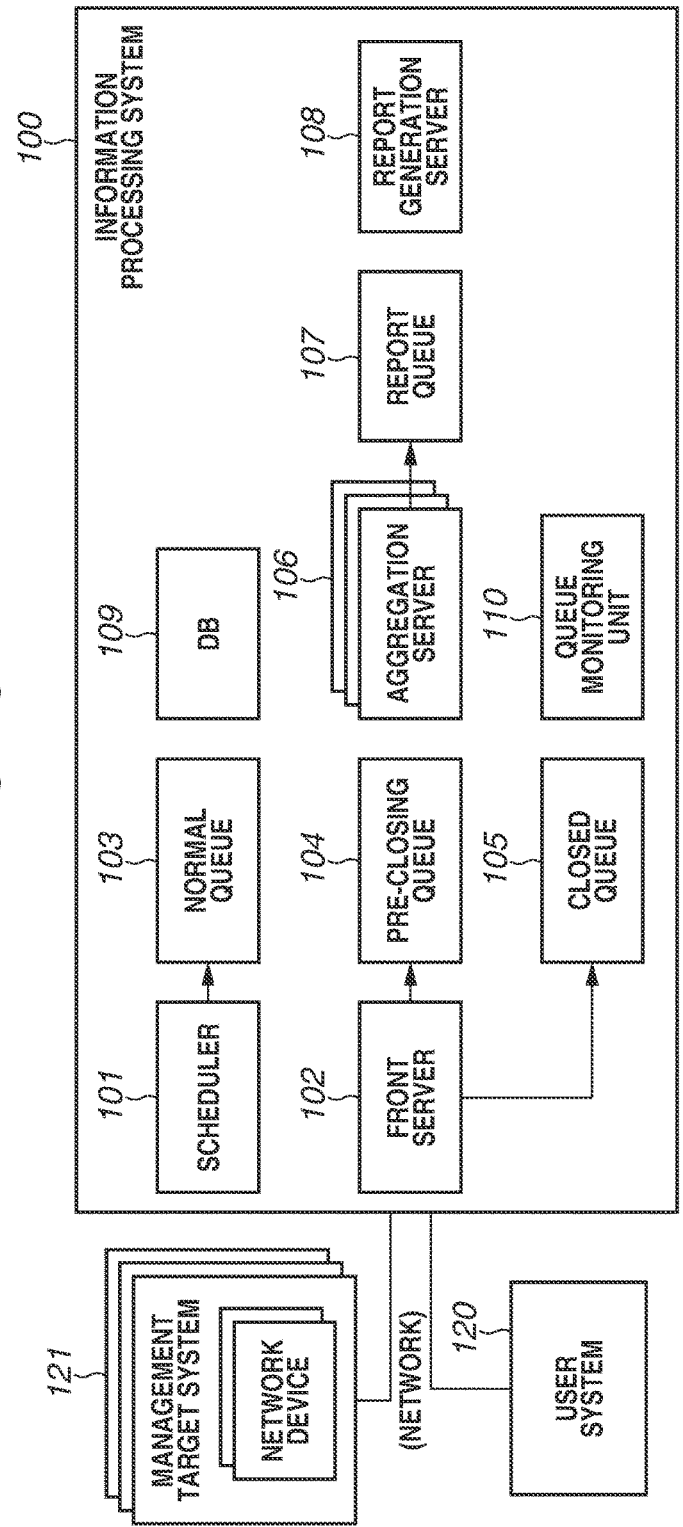
FIG. 16 is a diagram illustrating an example of a configuration of a network system according to a third exemplary embodiment.

FIG. 16 is a diagram illustrating an example of a configuration of a network system according to the third exemplary embodiment. FIG. 16 differs from FIG. 1 in that a queue monitoring unit 110 is added and a plurality of aggregation servers 106 is included.

The queue monitoring unit 110 monitors the numbers of jobs in the normal queue 103, the pre-closing queue 104, and the closed queue 105. If the numbers of jobs held in the queues exceed a predetermined threshold, the queue monitoring unit 110 scales out or up the aggregation server 106.

The thresholds of the job numbers can be differently set to each queue. In the present exemplary embodiment, the threshold for the pre-closed queue 104 is set to be relatively lower than that for the normal queue 103, such as 50 for the normal queue 103 and 10 for the pre-closed queue 104. Consequently, when report generation is requested by a user, the aggregation server 106 can be scaled out or up early to reduce the time till a report is provided to the user.

In the present exemplary embodiment, the queue monitoring unit 100 is described which is implemented in a virtual machine different from the other servers in the information processing apparatus 100. However, a similar queue monitoring function can be built into the front server 102 and/or the aggregation server 106.

A fourth exemplary embodiment deals with a modification of the processing performed by the front server 102 according to the first exemplary embodiment. The other processing of the present exemplary embodiment has almost the same configuration as that of the foregoing exemplary embodiments. Only differences will thus be described.

In the present exemplary embodiment, the front server 102 is configured to, if a job is input to the pre-closing queue 104, delete a job in the normal queue 103 which has a processing target coinciding with a processing target of the input job. This can reduce needless aggregate processing in the aggregation server 106.

Figure 17:
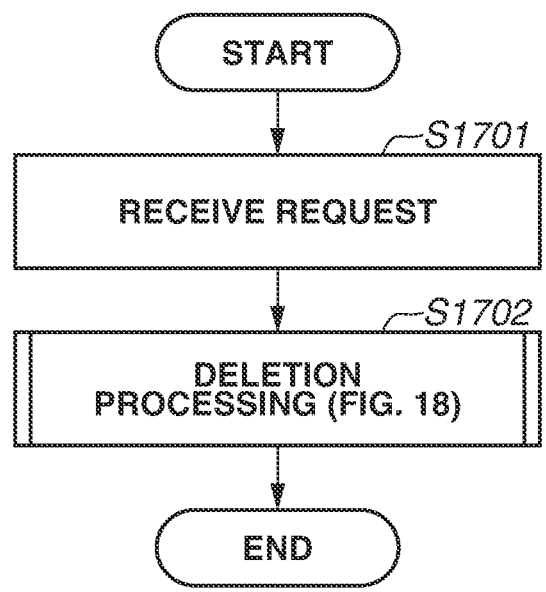
FIG. 17 is a flowchart for describing processing when a front server according to a fourth exemplary embodiment receives a processing request.

FIG. 17 is a flowchart for describing processing when the front server 102 according to the present exemplary embodiment receives a processing request.

In step S1701, the reception unit 202 receives a request input via the GUI provided by the providing unit 201. In step S1702, the front server 102 deletes (FIG. 18) a job which has a processing target coinciding with the processing target of the input request.

Figure 18:
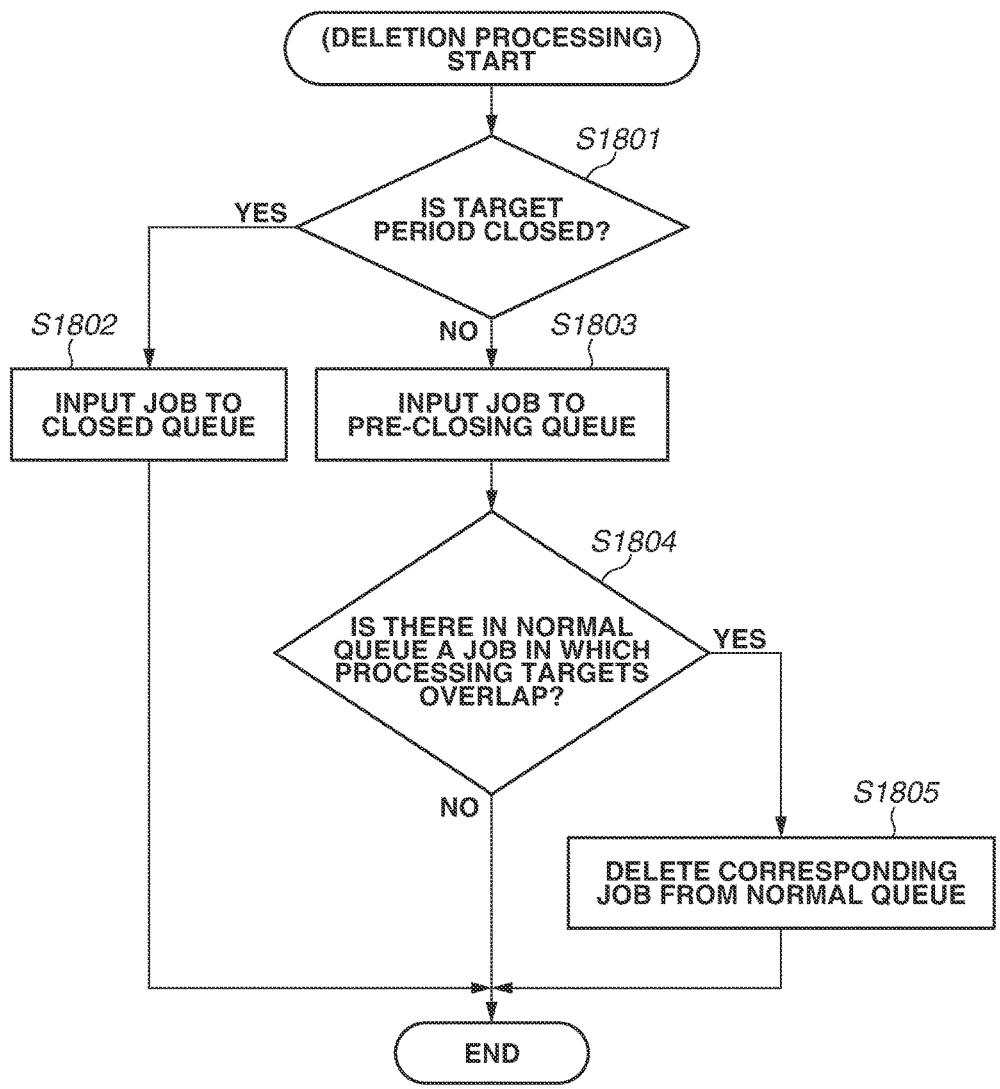
FIG. 18 is a flowchart for describing an example of a flow of deletion processing of a job according to the fourth exemplary embodiment.

FIG. 18 is a flowchart for describing an example of a flow of the job deletion processing by the front server 102 according to the present exemplary embodiment.

In step S1801, the registration unit 203 refers to the aggregate state table illustrated in FIG. 8 and determines whether the target period specified by the received request is closed. If it is determined that the target period is closed (YES in step S1801), the processing proceeds to step S1802. If it is determined that the target period is not closed (NO in step S1801), the processing proceeds to S1803. In step S1802, the registration unit 203 inputs a job including the contents specified by the received request as the attribute information to the closed queue 105. In step S1803, the registration unit 203 inputs a job including the contents specified by the received request as the attribute information to the pre-closing queue 104.

Figure 5:
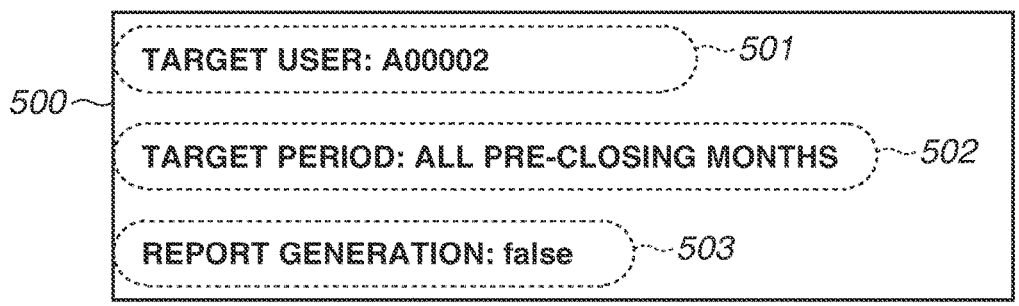
FIG. 5 is a diagram illustrating an example of a job managed by a normal queue.

In step S1804, the registration unit 203 determines whether there is a job including the same attribute information as that of the input job in the normal queue 103. For example, the registration unit 203 determines whether there is a job of the contents which show the target unit 501 and the target period 502 of FIG. 5 coinciding with the target user 401 and the target period 402 of FIG. 4, respectively. In step S1804, if it is determined that there is such a job (YES in step S1804), then in step S1805, the registration unit 203 deletes the job having the coinciding attribute information from the normal queue 103. The present processing ends.

A fifth exemplary embodiment deals with a method by which the aggregation server 106 obtains jobs from the plurality of queues, the method being different from that of the first exemplary embodiment. Specifically, a modification of the processing of FIG. 10 according to the first exemplary embodiment will be described. The other processing of the present exemplary embodiment has almost the same configuration as that of the foregoing exemplary embodiments. Therefore, only differences will thus be described.

Figure 19:
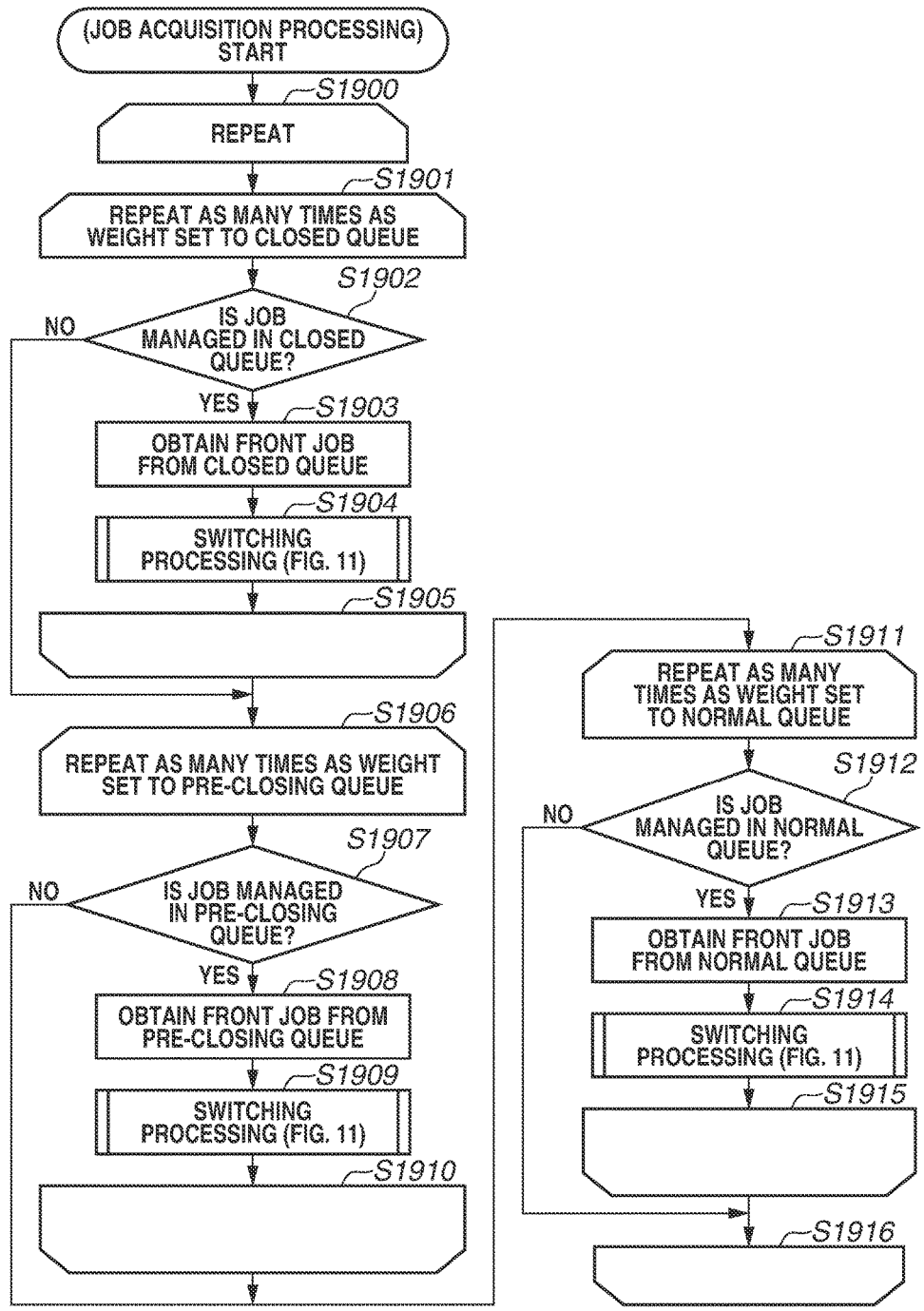
FIG. 19 is a flowchart for describing job acquisition processing by an aggregation server according to a fifth exemplary embodiment.

FIG. 19 is a flowchart for describing the job acquisition processing by the aggregation server 106 according to the fifth exemplary embodiment. The aggregation server 106 repeats the processing of steps S1900 to S1916.

In steps 1901 to S1905, the aggregation server 106 repeats processing as many times as a weight set to the closed queue 105.

In step S1902, the selection unit 301 determines whether a job is managed in the closed queue 105. If any job is managed in the closed queue 105 (YES in step S1902), the processing proceeds to step S1903. If no job is managed in the closed queue 105 (NO in step S1902), the processing proceeds to step S1906. In step S1903, the selection unit 301 obtains a front job from the closed queue 105. In step S1904, the switching unit 302 executes the switching processing (FIG. 11).

In steps S1906 to S1910, the aggregation server 106 repeats processing as many times as a weight set to the pre-closing queue 104.

In step S1907, the selection unit 301 determines whether a job is managed in the pre-closed queue 104. If any job is managed in the pre-closing queue 104 (YES in step S1907), the processing proceeds to step S1908. If no job is managed in the pre-closing queue 104 (NO in step S1907), the processing proceeds to step S1911. In step S1908, the selection unit 301 obtains a front job from the pre-closing queue 104. In step S1909, the switching unit 302 executes the switching processing (FIG. 11).

In steps S1911 to S1915, the aggregation server 106 repeats processing as many times as a weight set to the normal queue 103.

In step S1912, the selection unit 301 determines whether a job is managed in the normal queue 103. If any job is managed in the normal queue 103 (YES in step S1912), the processing proceeds to step S1913. If no job is managed in the normal queue 103 (NO in step S1912), the processing proceeds to step S1916. In step S1913, the selection unit 301 obtains a front job from the normal queue 103. In step S1914, the switching unit 302 executes the switching processing (FIG. 11).

FIG. 20 is a diagram illustrating an example of a table for managing the weights set to the respective queues. The table is stored in the DB 109.

In the processing illustrated in FIG. 19, the selection unit 301 of the aggregation server 106 refers to the table. For example, in steps S1901 to S1905, the selection unit 301 refers to a row 2013 corresponding to the closed queue 105 and repeats the processing up to six times. The numerical values indicating the weights in the table can be arbitrarily changed by the system administrator.

According to the present exemplary embodiment, the aggregation server 106 can obtain jobs from each queue according to the priorities corresponding to desired weights of the plurality of the queues.

A sixth exemplary embodiment deals with processing for automatically updating the settings of the weights set to the respective queues in the fifth exemplary embodiment. The present exemplary embodiment uses the system configuration illustrated in FIG. 16.

FIG. 21 is a flowchart for describing processing by which the queue monitoring unit 110 changes the weights of the respective queues according to the sixth exemplary embodiment.

The queue monitoring unit 110 repeats the processing of steps S2101 to S2105 at predetermined cycles. In step S2102, the queue monitoring unit 110 obtains the numbers of jobs in the normal queue 103, the pre-closing queue 104, and the closed queue 105, respectively. In step S2103, the queue monitoring unit 110 increments the numerical value indicating the weight of the queue in which the number of obtained jobs is the largest. For example, the queue monitoring unit 110 updates the table illustrated in FIG. 20 by incrementing the numerical value corresponding to the target queue by one. A maximum value is set to the weights. The weights are not updated to a value exceeding the maximum value. In step S2104, the queue monitoring unit 110 decrements the numerical value indicating the weight of the queue in which the obtained number of jobs is the smallest. For example, the queue monitoring unit 110 updates the table illustrated in FIG. 20 by decrementing the numerical value corresponding to the target queue by one. The weights have a minimum value (for example, one). The weights are not updated to a value less than the minimum value.

According to the present exemplary embodiment, the weights are dynamically changed in consideration of the numbers of jobs remaining in the queues for each type of jobs. Consequently, jobs of the type which is delayed can be preferentially executed.

Other Exemplary Embodiments

Apparatuses, systems, and methods constituted by appropriately combining the foregoing exemplary embodiments are also embraced by the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115168, filed Jun. 5, 2015, which is hereby incorporated by reference herein in its entirety.

What is claimed is:

1. An information processing system having a plurality of queues, including a first queue, a second queue, and a third queue, to manage processing jobs, the information processing system comprising,
a processor; and
a memory storing instructions that, when executed by the processor, causes the information processing system to perform operations including:
inputting a first job to the first queue, wherein the first job is regularly generated in the information processing system,
determining a queue to which a second job is to be input, wherein the second job is generated upon reception of a request corresponding to an operation of a user via a screen provided to a display by the information processing system,
wherein, in a case where aggregate processing of data to be processed for the second job is not completed, determining includes determining that the second job is to be input into the second queue, wherein a job input to the second queue is processed by the information processing system prior to a job input to the first queue, and
wherein, in a case where aggregate processing of the data to be processed for the second job is completed, determining includes determining that the second job is to be input into the third queue different from the second queue,
generating, in a case where a processing of the second job obtained from the second queue or the third queue has been performed by the information processing system, a report screen according to the performed processing, and
providing the generated report screen to the display for the user,
wherein a job input to the third queue is obtained by the information processing system prior to a job input to the second queue, and
wherein an aggregate processing of data to be processed for the obtained job input to the third queue is skipped on the information processing system.

2. The information processing system according to claim 1, wherein, in a case where the second job is input to the second queue according to determination, the executed instructions further cause the information processing system to perform operations including deleting the first job input to the first queue, wherein the first job includes attribute information that is the same as attribute information of the second job.

3. The information processing system according to claim 1, wherein the executed instructions further cause the information processing system to perform operations including managing weights with respect to the first, second, and third queues in a changeable manner respectively, wherein the weights correspond to priority of processing by the information processing system.

4. The information processing system according to claim 1,
wherein, in a case where the second job input to the second queue or the third queue is processed by the information processing system, a third job generated corresponding to the second job is input to a fourth queue different from the second queue and the third queue, and
wherein the report screen is provided to the display by using the processed data for the second job according to attribute information about the third job input to the fourth queue.

5. A control method for an information processing system having a plurality of queues, including a first queue, a second queue, and a third queue, to manage processing jobs, the control method comprising:
inputting a first job to the first queue, wherein the first job is regularly generated in the information processing system;
determining a queue to which a second job is to be input, wherein the second job is generated upon reception of a request corresponding to an operation of a user via a screen provided to a display by the information processing system;
wherein, in a case where aggregate processing of data to be processed for the second job is not completed, determining includes determining that the second job is to be input into the second queue, wherein a job input to the second queue is processed by the information processing system prior to a job input to the first queue, and
wherein, in a case where aggregate processing of the data to be processed for the second job is completed, determining includes determining that the second job is to be input into the third queue different from the second queue;
generating, in a case where a processing of the second job obtained from the second queue or the third queue has been performed by the information processing system, a report screen according to the performed processing; and
providing the generated report screen to the display for the user,
wherein a job input to the third queue is obtained by the information processing system prior to a job input to the second queue, and
wherein an aggregate processing of data to be processed for the obtained job input to the third queue is skipped on the information processing system.

* * * * *